United States Patent [19]

Alleé

[11] Patent Number: 4,988,059

[45] Date of Patent: Jan. 29, 1991

[54] LARGE AREA SINGLE SURFACE DISPLAY KITE

[76] Inventor: Wesley N. Alleé, 1232 W. Memphis, Broken Arrow, Okla. 74012

[21] Appl. No.: 398,959

[22] Filed: Aug. 28, 1989

[51] Int. Cl.$^5$ .............................................. B64C 31/06
[52] U.S. Cl. ................................................. 244/153 R
[58] Field of Search ........................ 244/153 R, 155 R

[56] References Cited

U.S. PATENT DOCUMENTS

| | | | |
|---|---|---|---|
| D. 273,211 | 3/1984 | Ferrari | 244/153 R X |
| 368,525 | 8/1887 | Fleharty | 244/153 R |
| 989,786 | 4/1911 | Lee et al. | 244/153 R |
| 1,480,889 | 1/1924 | Massa | 244/153 R |
| 2,737,360 | 3/1956 | Allison | 244/153 R |
| 3,740,008 | 6/1973 | Grauel | 244/153 R |
| 3,806,071 | 4/1974 | Brown | 244/153 R |
| 4,469,296 | 9/1984 | Lee | 244/153 R |
| 4,513,932 | 4/1985 | Sinha | 244/153 R |
| 4,729,530 | 3/1988 | Jalbert | 244/153 R X |
| 4,768,739 | 9/1988 | Schnee | 244/153 R X |
| 4,846,424 | 7/1989 | Prouty | 244/153 R |

*Primary Examiner*—Joseph F. Peters, Jr.
*Assistant Examiner*—James M. Kannofsky
*Attorney, Agent, or Firm*—Head & Johnson

[57] ABSTRACT

A kite of a single large sheet of material with a straight leading edge rearwardly to a trailing edge has a pair of outer struts, one at each end of the leading edge which extend at an inward angle rearwardly from the leading edge and a plurality of parallel struts spaced between the outer struts in a narrow band extending perpendicular to and rearwardly from the leading edge. A plurality of keels, one extending downwardly from each of the struts to a lower tip thereof, have leading edges substantially perpendicular to the leading edge of the sheet of material. Bridle liner extends from each of the keel tips to a single point of connection such that, with the bridle lines fully extended from the single point of connection, the leading edge of the kite takes the form of a bow.

11 Claims, 1 Drawing Sheet

LARGE AREA SINGLE SURFACE DISPLAY KITE

BACKGROUND OF THE INVENTION

This invention relates generally to large kites, and more particularly concerns kites providing a large display area.

Kites that have been used for advertising are usually of moderate size and used with only moderate success. To be effectively used for advertising purposes, a kite must be large enough to be visible at long distances. Such kites might for example be in the range of sixty by one hundred feet. As the size of the kite increases, so will the drag induced. Large kites in this category are difficult to handle when aloft. The many harness lines needed by these rigidly constructed kites adds to their control problems. More than (50) fifty people may be required to anchor one of these large kites. They are not easily stored. Since many of these kites have rigid support across their large area, they frequently will be destroyed after usage to eliminate storage inconvenience. Another difficulty plaguing large kites is their weight. Some of them weigh almost half a ton. The rigid supports needed to span their length and width are very heavy, even using light, space-age materials. In some kites in which no spars or rigid support are used, two spaced layers of material are needed to contain air rammed into the front of the kite. This rammed air inflate the kite with added drag to form an airfoil shape. Rigid supports add considerably to the cost of manufacturing a kite. If two surfaces are used, the cost and the difficulty of manufacture may be doubled.

It is an object of the present invention to provide an economical large kite that can display advertising, logos or designs.

Another object of the present invention is to provide a large kite with very little lift surface or induced drag so as to enhance the safety and handling characteristics of the kite.

Still another object of the present invention is to provide a large kite which is easily and compactly stored.

A correlated object of the present invention is to provide a large kite having rigid supports in the leading edge only and one layer of material.

A further object of the present invention is to provide a relatively lightweight large kite.

SUMMARY OF THE INVENTION

In accordance with the present invention, the leading edge of a sheet of material is provided with a narrow lifting surface made up of multiple keels with substantially parallel rigid supports attached to this sheet of material in a side by side configuration and spanning the entire leading edge. This large sheet of material may be taken aloft in a breeze while remaining in a substantially horizontal plane when the leading edge is held at the correct angle of attack. Bridle lines of equal length are attached between every two adjacent keels at their forward lower corners to form a cell between the keels. A second set of bridle lines of equal length are attached at one end to the centers of the first set of bridle lines and joined at the opposite end of the bridle lines to form a union. Bridle lines of the same length create an arch or bow formation in the kite, thus containing the air pressure necessary to prevent a collapse. A single flying line is attached to the union. The large sheet of material extending from the lifting surface maintains a substantially horizontal position while the keels are maintained in a substantially vertical position during flight. The keels prevent the kite from slipping in flight or rolling from side to side. Each keel includes a rigid support or strut along its length and a leading edge substantially perpendicular to its length. The outside two keels and struts point outwardly from the kite to taper the outermost cells from front to back. This prevents the edges of the kite from closing due to crosswinds. The narrow leading edge maintains a direct angle of attack because of the bridles point of attachment at the tips of the keels. The sheet of material drifts behind the leading edge of the kite deriving lift from the passage of air underneath. Most of the lift for the kite is derived from the narrow leading edge. Some drag results from the remainder of the kite material in line with the wind. Therefore, a lighter weight line than normal can be used and control can be safely maintained by one person. The unconnected arrangement of rigid supports across only the leading edge of the kite affords maximum lateral flexibility which permits storage of the kite without disassembly. Because there is only one surface, the amount of material used is reduced, as is the weight of the kite. The reduction in the amount of material and weight further enhances the storage capabilities and reduces the cost of manufacture.

BRIEF DESCRIPTION OF THE DRAWING FIGURES

Other objects and advantages of the invention will become apparent upon reading the following detailed description and upon reference to the drawings in which.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Figure 1:
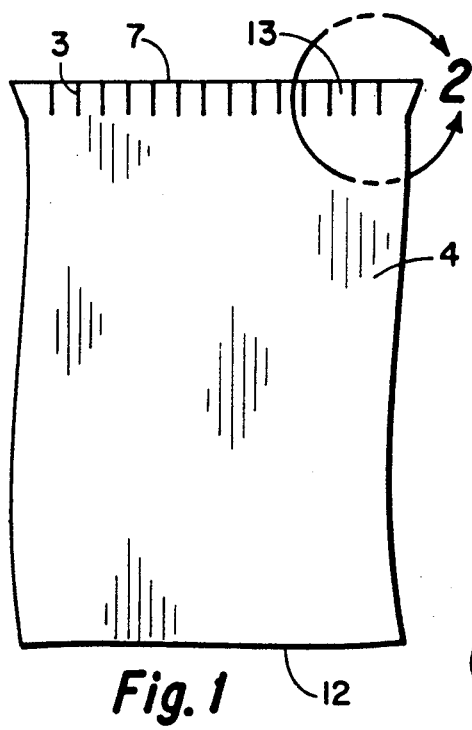
FIG. 1 is a bottom view of a rectangular embodiment of the kite illustrating the leading edge in comparison to the total surface area of the kite and the placement of the keels and rigid supports.
Figure 2:
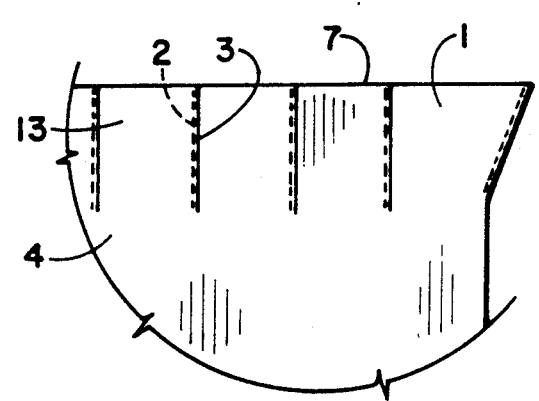
FIG. 2 is an enlarged, partial, bottom view of the kite of FIG. 1, illustrating the tapered effect at the outer cell.
Figure 3:
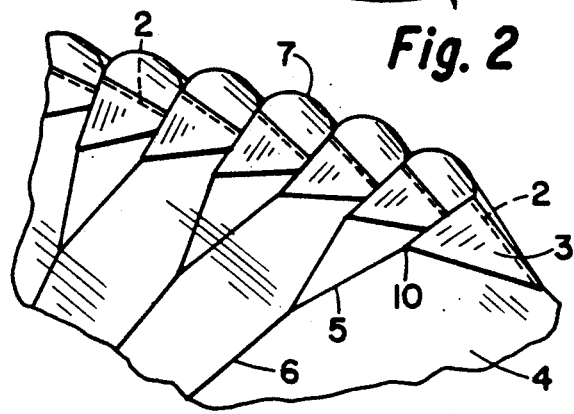
FIG. 3 is a partial, enlarged perspective view of the leading edge of the kite of FIG. 1 illustrating the rigid supports and bridle line attachments.
Figure 4:
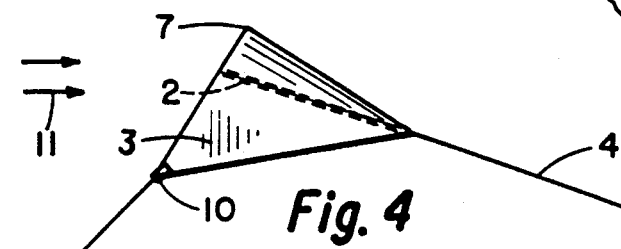
FIG. 4 is a cross sectional view of the kite of FIG. 1 demonstrating the angle of attack for the leading edge and the keels, rigid supports and bridle lines.
Figure 5:
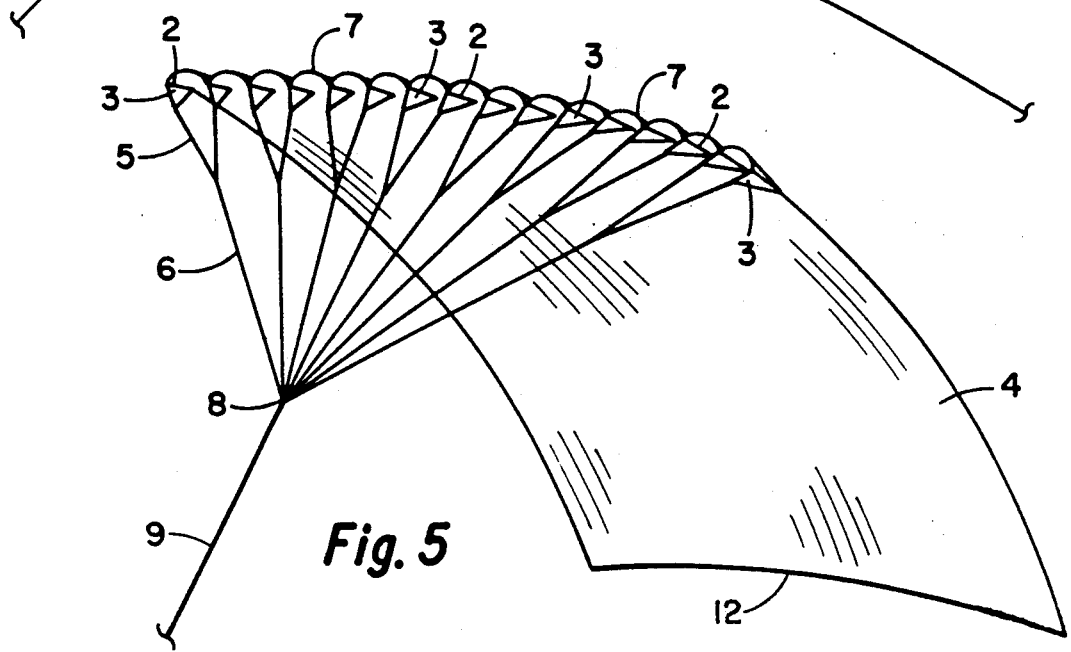
FIG. 5 is a perspective view of the kite of FIG. 1 in flight.

FIG. 1 illustrates a kite consisting of one large rectangular sheet of material 4 such as plastic, nylon, or the like, extending from a leading edge 7 to a trailing edge 12 with a narrow band 13 along the leading edge 7 which provides most of the lift for the kite. As seen more clearly in FIGS. 2 and 3, the leading edge 7 includes the band 13, keels 3 and spars 2 which define air cells between them. As shown in FIGS. 2 and 3, the keels 3 and spars 2 on the exterior edge of the kite point away from the kite to make the exterior cells 1 taper from the leading edge of the kite. FIG. 3 illustrates the bridle lines 5 and their place of attachment on the lower forward tips 10 of the keels 3. A first set of bridle lines 5, all the same length, are attached between adjacent keels 3. Another set of bridle lines 6, all the same length, are attached approximately to the centers of the first set of bridle lines 5. The spars 2 have a parallel relation to each other. The second set of bridle lines 6 are extended to a length one and one half times the width of the leading edge 7 and are joined at a single union 8 as seen in FIG. 5. This harness configuration develops an arch or partial circle which captures the air. In FIG. 4, with the direction of airflow 11 as shown, the angle of attack is maintained by the shape of the triangular keels 3 and the attachment of the bridle lines 5 to the lower forward tips 10 of the keels 3. The large sheet of material 4 drifts with the wind flow, similar to a flag in the wind. As shown in FIG. 5, a large number of keels 3, preferably isosceles right triangles, and spars 2 are used in conjunction with bridle lines 5 and 6 to form a single unit. Without the large trailing area of material 4 the wide kite would collapse. The width of the kite surface shown is uniform for the entire length, but many variations are possible. An average length of one and a half times the width has been found suitable. While all incremental areas do contribute to the total lift of the kite, the lift varies from a maximum value in the vicinity of the harness to a minimum value at the bottom edge of the kite.

Thus, it is apparent that there has been provided, in accordance with the invention, a large area single surface display kite that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A kite comprising:
    a large sheet of material extending from a straight leading edge rearwardly to a trailing edge;
    a pair of outermost struts, one at each end of said leading edge, extending at an inward angle rearwardly from said leading edge;
    a plurality of parallel struts spaced between said outermost struts in a narrow band extending perpendicular to and rearwardly from said leading edge;
    a plurality of keels, one extending downwardly from each of said struts to a lower tip thereof, said keels having leading edges substantially perpendicular to said leading edge of said sheet of material; and
    a plurality of bridle lines of equal length, one extending from each of said keel tips to a single point of connection of said lines.

2. A kite according to claim 1, said keels being right isosceles triangles.

3. A kite according to claim 1, said sheet of material being substantially rectangular.

4. A kite according to claim 3, said leading and trailing edges being spaced by a distance approximately 1.0 to 3.0 times the distance between said outermost of said struts.

5. A kite according to claim 3, said leading and trailing edges being spaced by a distance approximately 1.5 times the distance between said outermost of said struts.

6. A kite comprising:
    a large sheet of material extending from a straight leading edge rearwardly to a trailing edge;
    a pair of outermost struts, one at each end of said leading edge, extending at an inward angle rearwardly from said leading edge;
    a plurality of parallel struts spaced between said outermost struts in a narrow band extending perpendicular to and rearwardly from said leading edge;
    a plurality of keels, one extending downwardly from each of said struts to a lower tip thereof, said keels having leading edges substantially perpendicular to said leading edge of said sheet of material; and
    a first plurality of bridle lines of equal length, each one connecting different adjacent pairs of said keel tips including those of said outermost keels, and a second plurality of bridle lines of equal length, each one extending from the midpoint of a different one of said first plurality of bridle lines to a single point of connection.

7. A kite according to claim 6, said second plurality of bridle lines being approximately 1½ times the distance between said outermost struts.

8. A kite according to claim 6, said keels being right isosceles triangles.

9. A kite according to claim 6, said trailing edge being spaced from said leading edge by a distance approximately 1 to 3 times the distance between said outermost keels.

10. A kite according to claim 6, said trailing edge being spaced from said leading edge by a distance approximately 1 to 5 times the distance between said outermost keels.

11. A kite comprising:
    a large sheet of material extending from a straight leading edge rearwardly to a trailing edge;
    a pair of outermost struts, one at each end of said leading edge, extending at an inward angle rearwardly from said leading edge;
    a plurality of parallel struts spaced between said outermost struts in a narrow band extending perpendicular to and rearwardly from said leading edge;
    a plurality of keels, one extending downwardly from each of said struts to a lower tip thereof, said keels having leading edges substantially perpendicular to said leading edge of said sheet of material; and
    bridle means extending from each of said keel tips to a single point of connection such that, with said bridle means fully extended from said single point of connection, said leading edge takes the form of a bow.

* * * * *